T. S. SPIVEY.
PORTABLE COOKING APPARATUS.
APPLICATION FILED JULY 2, 1915.
1,174,362.
Patented Mar. 7, 1916.
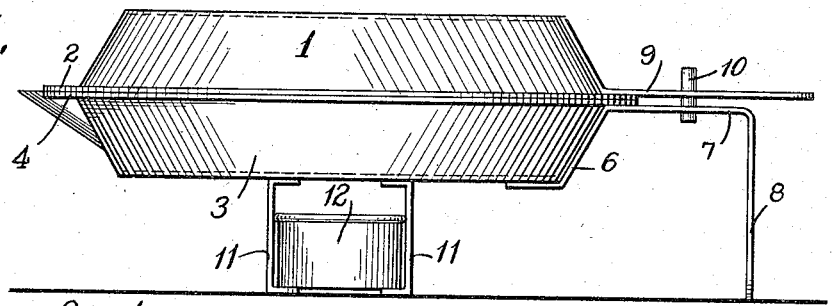
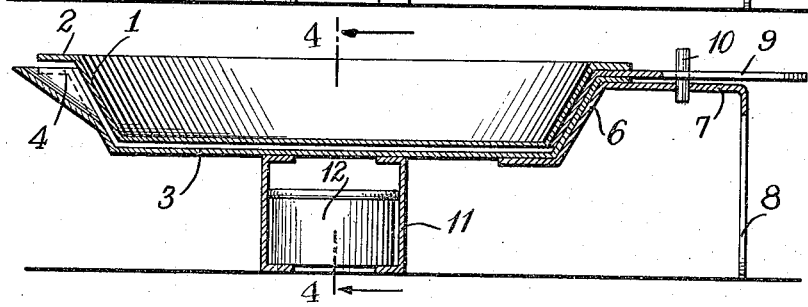
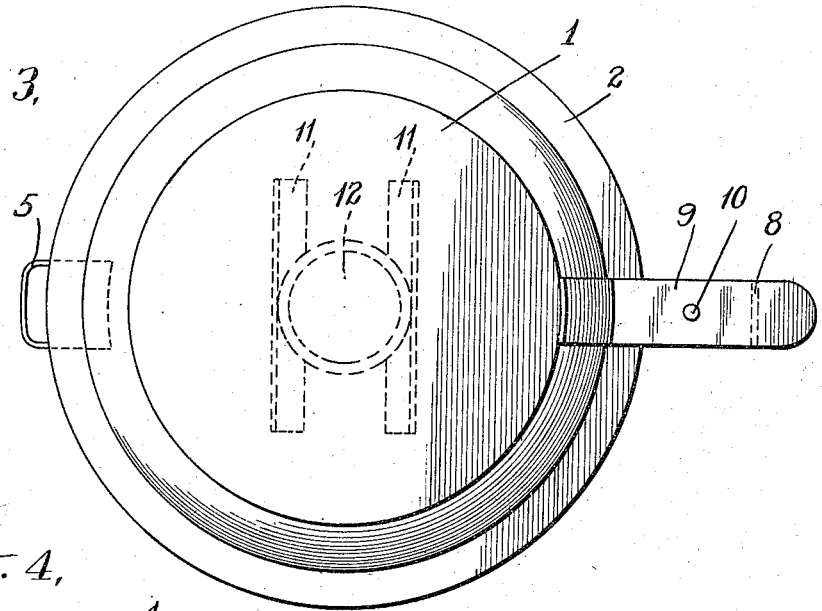
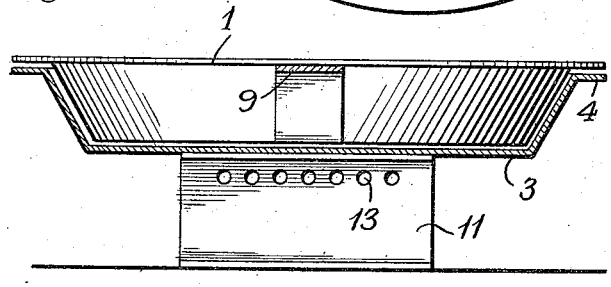
INVENTOR
Thomas S. Spivey
BY
J. R. Edmonds
ATTORNEY.

UNITED STATES PATENT OFFICE.

THOMAS S. SPIVEY, OF CINCINNATI, OHIO.

PORTABLE COOKING APPARATUS.

1,174,362. Specification of Letters Patent. Patented Mar. 7, 1916.

Application filed July 2, 1915. Serial No. 37,636.

*To all whom it may concern:*

Be it known that I, THOMAS S. SPIVEY, a citizen of the United States, residing at Cincinnati, in the county of Hamilton and State of Ohio, have invented certain new and useful Improvements in Portable Cooking Apparatus, of which the following is a specification.

My invention relates to a portable cooking or heating apparatus especially adapted for use in camp.

My object is to provide a simple and light weight device of this character, which can be manufactured at small cost, will stand hard usage and can be packed in small space for transportation. It is especially adapted to enable private soldiers in an army to carry individual cooking outfits weighing only a few ounces each and thereby cook their own meals.

Essentially, my device comprises a pair of pans of simple construction, one of which is provided with a handle having a pin extending therethrough, and the other of which has an extension provided with a hole. The first-named pan may be used as a cover for the second with the pin inserted in the hole referred to to hold the pans in proper position edge to edge, the pans preferably being provided with outwardly extending flanges at their top edges. When the top cover pan is reversed, it is adapted to nest snugly within the bottom pan with the pin inserted in the same hole as above referred to to hold the pans in this position for packing and carrying the same. Preferably the extension referred to on the bottom pan having the hole therein has a downwardly extending portion at its end to form a support, a supporting member or members also being secured to the central portion of the bottom pan and adapted to receive within or between the same, a can of solidified alcohol, or an alcohol burner or other source of heat.

In order that a clearer understanding of my invention may be had, attention is hereby directed to the accompanying drawings forming part of this application and illustrating a preferred embodiment of my invention.

In the drawings, Figure 1 represents a side elevation of my device with the top pan inverted to form a cover for the lower pan, Fig. 2 is a central vertical section through the device, with the top pan reversed from its position shown in Fig. 1 and nested within the bottom pan, Fig. 3 is a top plan view of the device as in Fig. 1, and Fig. 4 is a transverse section taken on line 4—4 of Fig. 2, except that the top pan is shown in side elevation with, however, the horizontal portion of the handle thereof in section.

Referring to the drawings, the top pan 1 is provided with an outwardly extending peripheral flange 2 around its top or open end, and the bottom pan 3 is shown with a corresponding peripheral flange 4 extending about its top edge. The bottom pan 3 may be provided with a spout 5, and is provided at the side opposite to spout 5 with an extension 6 comprising a metal strip secured preferably to the bottom and side of pan 3, having a horizontal portion 7 extending outwardly below and in contact with the under side of flange 4 and having a downwardly bent end portion 8. The top pan 1 has a handle 9 secured to its side portion and extending out horizontally below and in contact with the under side of flange 2. The pin 10 is mounted in handle 9 of pan 1 to extend beyond the same on both the upper and under sides thereof as shown. The horizontal portion 7 of extension or support 6 of the bottom pan 3 is provided with an opening therethrough in which pin 10 is adapted to be inserted, as shown in Figs. 1 and 2.

The support or burner-receiving and shielding device may be separate, but preferably is secured to the under side of pan 3. Preferably this comprises a pair of flanged sheet-metal members 11, 11, the upper flanges being secured to the under side of pan 3 and the lower flanges serving as supports for the outfit. Preferably supports 11 are parallel and spaced apart sufficiently to receive a can 12 of solid alcohol or the like, or a device for burning liquid alcohol, or other suitable source of heat, which may be positioned upon the lower flanges of supports 11, the latter being perforated if desired, as shown at 13, to admit air.

Preferably, the various parts are made of sheet-metal, the spout 5, supports 11, extension 6 and handle portion 9 being secured to their respective pans by any suitable means, preferably by spot-welding.

Preferably the pans have outwardly sloping sides as illustrated, the upper pan being of suitable size to rest in inverted position with its flange mounted upon the flange of the bottom pan, as shown in Fig. 1, when it is desired to use pan 1 as a cover, and to nest within pan 3, with the under side of flange 2 of pan 1 resting upon the flange 4 of pan 3, when pan 1 is nested within pan 3. The device may, if desired, be used as a double boiler when pan 1 is nested within pan 3, the upper pan 1 being made of considerably less depth than pan 3 when it is desired to utilize the same in forming a double boiler. In either position of pan 1, the device is firmly supported by standard 8 and supports 11, the pan 1 being held in proper relation to pan 3, with sufficient firmness to prevent the same being knocked off or separated from pan 3, by the engagement of pin 10 in the hole in extension 7, when the upper pan is in either of the positions shown in Figs. 1 and 2.

After the pans have been used for cooking the meal, they may conveniently serve as platters from which two persons may partake of the meal so prepared.

Having now described my invention, what I claim as new therein and desire to secure by Letters Patent is as follows:—

1. In a cooking device, the combination of a pair of pans having outwardly flanged tops, one of the same having a handle extending outwardly from the flanged top with a pin extending therethrough, on both sides thereof, the other having a support secured to its under side, adapted to contain a source of heat, and also having a metal strip secured thereto, having a portion extending outwardly from its flanged top, said portion having a hole therein, and a downwardly bent portion, adapted to serve as an additional support, said first pan being adapted to rest inverted, as a cover, on said second pan, with said pin in said hole, and also adapted to be nested in said second pan, with said pin in said hole, substantially as set forth.

2. In a cooking device, the combination of a pair of pans having outwardly flanged tops, one of the same having a handle extending outwardly from the flanged top, the other having a support secured to its under side, adapted to contain a source of heat, and also having a strip secured thereto, having a portion extending outwardly from its flanged top, and a downwardly bent portion, adapted to serve as an additional support, said first pan being adapted to rest inverted, as a cover, on said second pan, and also adapted to be nested in said second pan, said handle and the outwardly-extending portion of said strip having means adapted to interlock, substantially as set forth.

This specification signed and witnessed this 29 day of June, 1915.

THOMAS S. SPIVEY.

Witnesses:
J. WM. JOHNSON,
CLYDE P. JOHNSON.

Copies of this patent may be obtained for five cents each, by addressing the "Commissioner of Patents, Washington, D. C."